Figure 1:
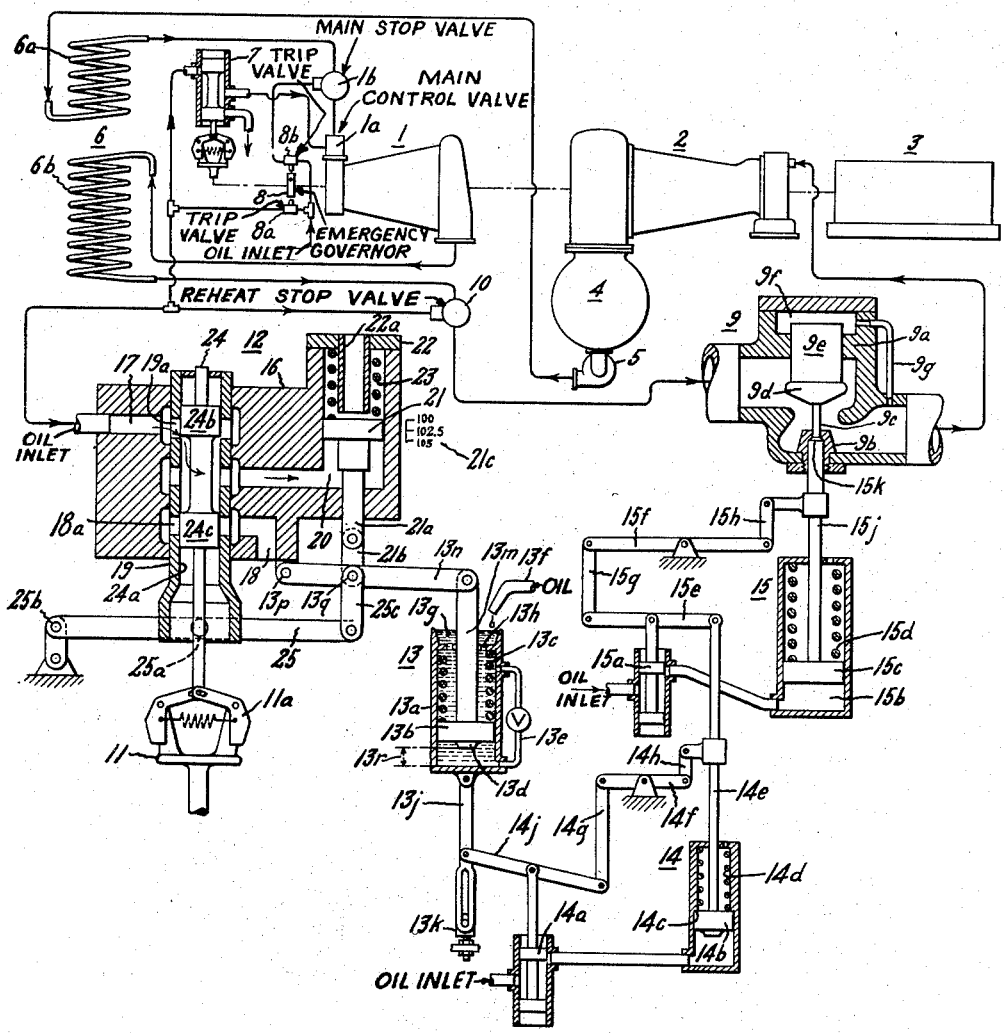

Dec. 9, 1958

M. A. EGGENBERGER 2,863,289

HYDRAULIC SERVO-MECHANISM FOR
STEAM TURBINE INTERCEPT VALVE

Filed Aug. 4, 1955

2 Sheets-Sheet 2

Inventor:
Markus A. Eggenberger
by
His Attorney

United States Patent Office
2,863,289
Patented Dec. 9, 1958

2,863,289

HYDRAULIC SERVO-MECHANISM FOR STEAM TURBINE INTERCEPT VALVE

Markus A. Eggenberger, Schenectady, N. Y., assignor to General Electric Company, a corporation of New York Application August 4, 1955, Serial No. 526,528

9 Claims. (Cl. 60—73)

This invention relates to hydraulic-mechanical governing mechanism for large steam turbines, particularly to an improved hydraulic servo mechanism for positioning the "intercept valve" used to assist the main control valve mechanism in the event of abnormal overspeed conditions.

In a large compound turbine-generator powerplant arranged to reheat the motive fluid, the control system of the turbine consists, in addition to the usual speed control and protection system, of a "pre-emergency control system," which is able to control the speed temporarily after load has been lost on the generator until the energy stored in the reheater is used up. The steam flow controlling valve or valves of this pre-emergency control system are called "intercept valves." As a "second line of defense" against overspeed, which could be caused by stored steam in the reheater if the intercept valves should fail to close, there is provided a "reheat stop valve," which is controlled by the emergency governor of the turbine and is mounted in series with each intercept valve. The reheat stop valve is either in fully open or fully closed position and is not intended to do any throttling or governing.

The pre-emergency control system may be arranged so that the intercept valves start closing at 101% of rated speed, which insures that the valves stay fully open during normal operation and when the generator is connected to the system and so that the intercept valves will be fully closed if the speed reaches 105% of rated speed when the acceleration takes place slowly. On a sudden loss of load, however, when the unit is speeding up at a maximum rate, the control system will follow with a certain lag, causing the intercept valves to start closing at perhaps 103% of rated speed. Therefore, the maximum speed which the unit will reach is approximately 3% of rated speed higher than what it would be if the control reacted with no lag.

In case the peak speed following the loss of full load exceeds the trip speed of the emergency governor the steam supply to the turbine will be entirely shut off by closure of the main and reheat stop valves and, consequently, the unit will not be able to supply any station auxiliary load which may be required to sustain the operation of the plant.

In order to keep the maximum speed of a large central station turbine-generator of the "reheat" type below the trip speed of the emergency governor (which is usually set at 110% of rated speed), the pre-emergency control must act very promptly, and in some cases the above-mentioned "lag" of 3% of the pre-emergency control system is beyond a tolerable value to achieve the required control performance.

Because of the tremendous amounts of energy to be handled, the very few seconds required to produce a dangerous overspeed if the governing mechanism fails, and the catastrophic results of overspeeding, governing mechanism of the utmost reliability and capable of acting in a very small fraction of a second is needed. Furthermore, the mechanism should react faster in the event of excessive acceleration of the turbine rotor, if the overall time required to close the intercept valve is to be held within allowable limits.

Accordingly, an object of the present invention is to provide an improved hydraulic-mechanical servo-mechanism for actuating the intercept valve of a large reheat type compound steam turbine.

A specific object is to provide improved governing mechanism of the type described which reacts in one manner upon a gradual increase of speed, but reacts differently if the acceleration exceeds a preselected value, in order that the intercept valve will be closed quicker in the event of greater acceleration.

A still further object is to provide an improved hydraulic servo-mechanism for positioning an intercept valve, requiring only extremely simple mechanism which can be designed to have utmost reliability.

Figure 2:
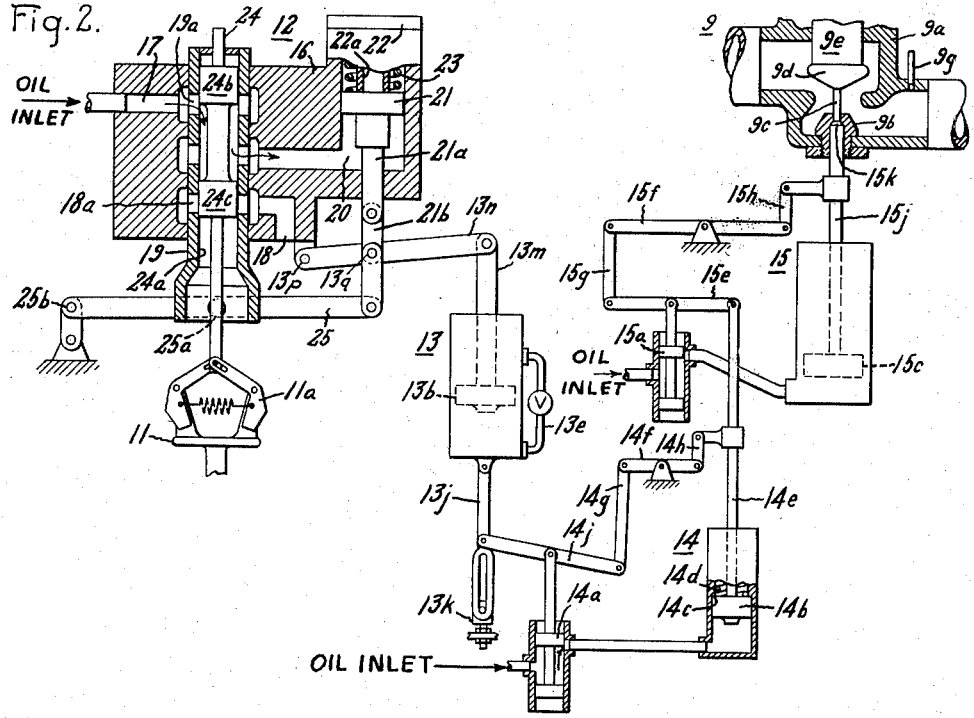
Figure 3:
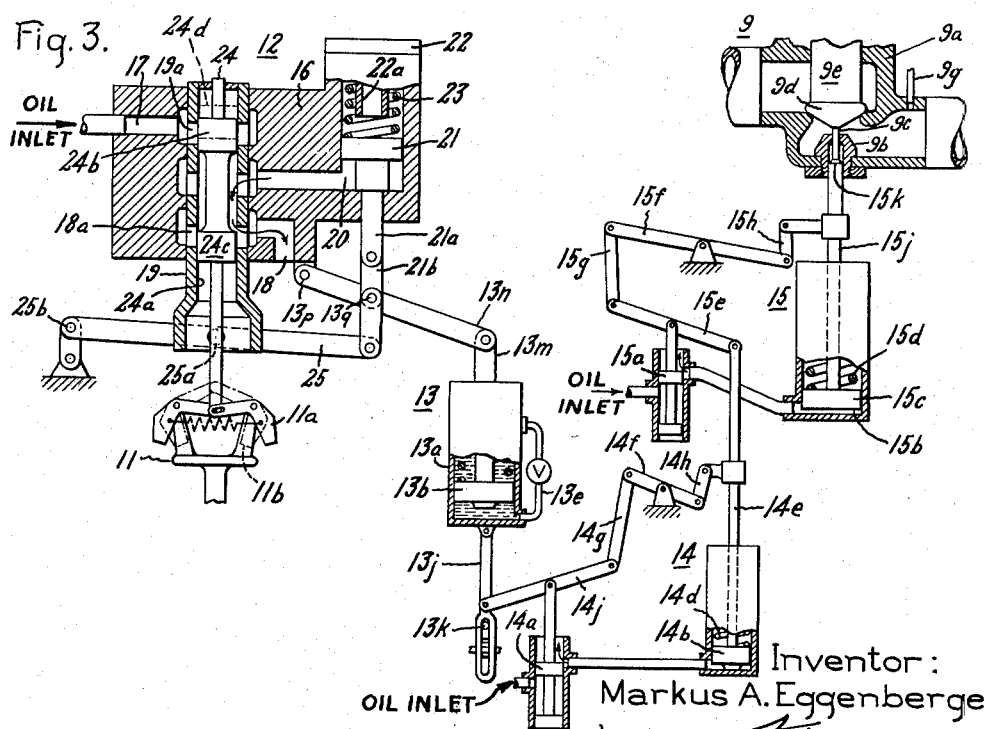

Other objects and advantages will become apparent from the following description taken in connection with the accompanying drawings, in which Fig. 1 is a diagrammatic representation of a compound steam turbine powerplant having shown in more detail an intercept valve with improved servo mechanism incorporating the invention, and Figs. 2 and 3 show the intercept valve and its control mechanism in various conditions of operation. Fig. 1 illustrates the normal steady-state operation; Fig. 2 represents the position of the governing mechanism when the turbine is below rated speed or at standstill; and Fig. 3 represents the condition of the governing mechanism upon occurrence of an overspeed condition, and with great acceleration.

Generally stated, the invention is practiced by providing hydraulic servo mechanism with a special "dashpot break-down link," which operates in one manner upon gradual increase of speed, but acts differently to cause faster reaction of the intercept valve servo motor in the event of too great acceleration.

Referring now more particularly to Fig. 1, the invention is illustrated as applied to a compound steam turbine-generator plant having a high pressure turbine element 1 and at least one lower pressure turbine element 2. These may be on different axes, or may be coupled together on a common axis as shown in the drawing, and drive an electric generator 3. The turbine 2 may exhaust into still lower pressure turbines or into the condenser 4, from which condensate is returned by boiler feed pump 5 to the steam generator indicated at 6 as having primary steam generating coils 6a and a reheater section 6b.

It will be seen in Fig. 1 that the path of the turbine motive fluid is from the boiler feed pump 5 to the steam generator 6a, then through the main stop valve 1b and main control valve gear 1a, through the high pressure turbine 1, and back to the reheater 6b. Steam discharged from the reheater passes through the reheat stop valve 10 and the intercept valve 9, thence to the inlet of the lower pressure turbine 2. This simple diagrammatic showing of course does not include many conventional elements of steam powerplants, such as feed-water heaters, lubricating system, packing control system and numerous minor details of the turbine control system, the arrangement of which will be understood by those familiar with steam powerplant design.

The main steam controlling mechanism includes the main control valves represented at 1a and controlled by the main speed governor 7, and the main stop valve 1b which is controlled by the emergency speed governor 8 and is used as a second line of defense against overspeed, which could be caused by the main steam supply in case of failure of the main control valves to close if load should be suddenly lost on the generator.

The reheat steam controlling mechanism comprises the pre-emergency control system with the pre-emergency speed governor 11 driven by the turbine shaft which controls the intercept valve 9 by means of special mechanism incorporating the invention. As a second line of defense against overspeed which could be caused by reheat steam in case of failure of the intercept valve to close if load was lost on the generator, a reheat stop valve 10, controlled by the emergency speed governor, is used.

The main speed governor will control the unit under normal starting and running conditions. When the unit loses load and the speed increases, the pre-emergency governor will take the control away from the main governor and control the steady state speed of the unit between 105 and 101% of rated speed as long as there is steam available from the reheater. If the transient speed following loss of load exceeds 110% approximately, the emergency governor will trip and shut the turbine down.

The pre-emergency servo mechanism comprises the pre-emergency speed governor 11, a primary speed relay 12 conected by a special "dashpot break-down link" 13 to a secondary relay 14, which in turn controls the servomotor 15 to position the intercept valve 9.

The primary speed relay 12 comprises a housing 16 having an oil inlet port 17 and a drain port 18, a first bore in which is slidably disposed a bushing member 19, and a second bore defining a chamber 20 in which is disposed the output piston 21. The upper end of chamber 20 is closed by a cover member 22 having formed integral therewith a central tubular member 22a which serves as a stop member defining the uppermost position of piston 21. A biasing spring 23 is disposed around the stop member and engages piston 21 to cause it to move to the lowermost position in its range of movement when the oil pressure in chamber 20 is released. Actuating oil at suitable pressure is admitted to the chamber 20 by the primary pilot valve 24, which is connected to be positioned by the fly-ball speed governor 11. Pilot 24 is slidably disposed in the bore 24a of the slidable bushing 19. The restoring means for the primary pilot comprises a lever member 25 connected by the pivot indicated in dotted lines at 25a to the lower end of bushing 19, and supported on a fixed fulcrum 25b. The opposite end of lever 25 is connected by links 25c and 21b to the piston rod 21a of the pre-emergency speed relay piston, in a manner which will be obvious from the drawing.

The combination of the fly-ball governor 11, bushing 19, pilot 24, and speed signal piston 21 is well known in the art. In the normal operating condition, shown in Fig. 1, actuating oil supplied to inlet port 17 passes by way of port 19a of bushing 19 past the upper land 24b of the primary pilot to the speed relay chamber 20, as indicated by the arrows in Fig. 1. In normal operation, the land 24b will admit just enough oil to make up for leakage from chamber 20, so as to maintain the position of speed relay piston 21. If the speed of fly-ball governor 11 should increase, pilot 24 will descend so that land 24b closes port 19a, and land 24c will uncover drain port 18a thus reducing the oil pressure in chamber 20 and causing piston 21 to descend slightly. This downward movement causes lever 25 to pivot clockwise about fulcrum 25b, so as to lower bushing 19 and restore the flow of oil to chamber 20 to maintain the position of piston 21 corresponding to the increased speed condition. Thus the position of piston 21 is a measure of the rotational speed of the turbine, and a scale can be appended, as indicated at 21c, from which the speed can be read. When the speed drops, pilot 24 rises to admit more oil to chamber 20 and move piston 21 up against the stop member 22a, which position may correspond to a speed of 99.6% of rated speed.

The secondary hydraulic relay 14 comprises the secondary servo-pilot 14a controlling the supply of actuating liquid to the secondary output piston 14b. It will be seen from Fig. 1 that the uppermost position of piston 14b is determined by an annular shoulder 14c in the cylinder wall, while the lowermost position is determined by engagement of piston 14b with the bottom of the cylinder. The piston is biased downwardly by spring 14d. As will be apparent in Fig. 1, the restoring effect is communicated to the pilot 14a by lever 14f and links 14g, 14h, the last mentioned of which is connected to move with the secondary relay output rod 14e.

In normal operation, with the main governor 7 in control, the pilot 14a will be elevated just the minimum amount required to maintain the pressure below piston 14b so as to hold it in uppermost position against the stop 14c. This will be accomplished by adjusting the stop means 13k. It may be noted that the pilot land 14a is of an axial length essentially equal to the axial extent of the port with which it cooperates, so that movement of land 14a downwardly from the neutral position will cause liquid to be drained from the secondary relay cylinder past the upper end surface of land 14a, permitting piston 14b to descend under the influence of spring 14d.

The servomotor 15 comprises pilot 15a arranged to admit operating liquid to chamber 15b so as to move piston 15c upwardly against the bias of spring 15d. Pilot 15a is connected to be positioned by lever 15e, and to be restored by lever 15f and links 15g, 15h, the last mentioned of which is connected to move with the piston rod 15j, in a manner which will be obvious from the drawing. In normal operation, pilot 15a will be raised just sufficiently to admit to chamber 15b the liquid required to compensate for leakage and maintain piston 15c in its uppermost position, defined by engagement of an annular valve stem sealing shoulder identified 15k with a cooperating seat in the bushing 9b.

The intercept valve 9 is illustrated diagrammatically as comprising a housing 9a supporting the bushing assembly 9b, in which is slidably disposed the valve stem 9c. Because it must perform accurate throttling functions, the valve is of a pressure-balanced type, the flow control disk 9d having a piston portion 9e the upper surface of which is exposed to the downstream pressure, communicated to chamber 9f by a pressure balancing conduit 9g.

The arrangement of the servomotor 15 is such that in normal operation at rated speed, with the governor 7 controlling the main valves 1a, the valve disk 9d will be in its uppermost position shown in Fig. 1, with pilot 15a opened just sufficiently to maintain piston 15c in its uppermost position. When pilot 15a is lowered by piston rod 14e, liquid is drained from chamber 15b past the upper end surface of pilot 15a, permitting the piston 15c to descend.

The essence of the invention lies in the special "dashpot break-down link" 13 which connects the primary speed relay 12 with the secondary pilot valve lever 14j. This link comprises a dashpot cylinder 13a having a piston 13b biased downwardly by coil spring 13c. The lowermost position of piston 13b is determined by engagement of the stop member 13d with the bottom of the cylinder. Piston 13b is provided with a bypass tube 13e, the effective size of which may be adjusted by the valve shown in the drawing. The function of this bypass will be seen hereinafter. The dashpot cylinder is at all times kept filled with oil, on both sides of piston 13b, as for instance by oil supplied by a suitable nozzle 13f. In an actual machine, there may be enough oil splashed around the mechanism to keep the dashpot filled through the small reservoir 13g formed in the upper end surface of the cylinder. This reservoir communicates with the interior of the cylinder by way of one or more large ports 13h. These ports are of sufficient area as to cause substantially no hydraulic resistance to any motion of the piston which will occur in operation. The above and below piston chambers of the dashpot are in communication by way of the tube 13e, in which a needle valve v is mounted, which permits continuous adjustment of the flow restriction effected by tube 13e. This arrangement restricts the possible rate of position change of the piston 13b with respect to cylinder 13a as will be apparent from the explanations which follow later in this description. The lower end of housing 13a has projecting therefrom a rod member 13j pivoted to the left-hand end of lever 14j. The uppermost position of lever 14j is determined by an adjustable stop member 13k, illustrated as a transverse pin disposed in the slotted lower end of rod 13j, the pin being supported on a threaded member secured in desired position by lock-nuts. This stop means could of course assume many other forms.

The input end of the breakdown link is formed by the piston rod 13m, the upper end of which is pivoted to the right-hand end of lever 13n. It will be seen in Fig. 1 that the left-hand end of lever 13n is carried on a fixed fulcrum 13p and a mid-portion is pivoted at 13q to the links 21b, 25c.

In normal operation with the main governor in control, the pre-emergency governor 11 will maintain speed relay piston 21 at the "100%" position (Fig. 1), and the dashpot piston 13b will be raised above the bottom of the cylinder 13a by a distance identified 13r, with rod 13j in uppermost position against stop 13k and spring 13c somewhat compressed. Now it will be seen that, if the speed relay piston 21 rises slightly, the dashpot piston 13b will merely move upward to compress spring 13c an additional increment, and without altering the condition of lever 14j. Similarly, if speed relay piston 21 moves downward slowly, by an amount corresponding to less than 1% of rated speed, the dashpot piston 13b will move downwardly a corresponding amount, during which the spring 13c is permitted to extend slightly, oil flows upwardly through bypass 13e into the space above the piston, and lever 14j still remains against the stop 13k, with no change in the position of lever 14j. The dashpot cylinder 13a will be caused to move downwardly only after the abutment 13d engages the bottom of the cylinder. It remains to note that, in the event piston 13b is caused to move downwardly at a rate in excess of the capacity of the bypass 13e to transfer oil from below the piston to the space above, the cylinder 13a will immediately be caused to move downwardly so that rod 13j moves downwardly away from the stop 13k and positions lever 14j to actuate valve 9 toward closed position.

It will be apparent from Fig. 1 that the length of the rods 13m and 13j determine the steady state speed at which the pre-emergency governor will start moving the floating lever 14j, upon a gradual speed increase, and also that the adjustment of stop means 13k determines the additional speed increase which is necessary to move the pilot valve 14a downwardly to just start moving the secondary pre-emergency speed relay, which in turn will take the main pilot valve 15a down to its "on port" position and start moving the intercept valve servo motor 15 downwardly. The system can be adjusted, for instance, so the dashpot link becomes "solid" at 100.8% steady state speed, the pilot valve 14a will be in "on port" position at 100.9% speed, and the intercept valve servomotor will start down at 101% of rated speed.

The entire method of operation of the servo mechanism may be seen from a comparison of Figs. 2 and 3 with the normal operating condition represented by Fig. 1, as follows.

Fig. 3 actually represents the condition of the mechanism immediately after the speed has increased at a high rate of acceleration to a value above 104% of rated speed, with the result that the servo mechanism has moved the intercept valve disk 9d to the fully closed position shown. But, with a small modification, Fig. 3 may also be considered to represent the condition of the mechanism in the completely shut-down condition, with no operating liquid supplied to the inlet port 17. When the turbine is at rest, the pre-emergency speed governor 11 will of course be in the fully collapsed condition, with the fly-weights 11a in the position indicated in dotted lines at 11b. This means that pilot 24 will be in its extreme upper position, bushing 19 will be in its lowermost position, and pilot land 24b will be raised to the dotted line position 24d. Thus when actuating liquid is supplied to inlet port 17, it will have free access past the land 24b to the chamber 20 so to cause the speed relay piston 21 to rise. With this modification and with the dashpot piston 13b all the way down, hitting the bottom of cylinder 13a with the lower stop 13d, Fig. 3 may be considered to represent the completely shut-down condition, with the turbine at rest and no oil being supplied to operate the servo mechanism. It will be observed that the linkages are so designed that, in this shut-down condition, the secondary relay piston 14b is at the bottom of its stroke against the bottom of its cylinder, lever 14j is in its extreme counter-clockwise position with the slotted rod end portion disengaged from the stop 13k, and with pilot 14a lowered so as to define a drain port for the secondary relay cylinder. Similarly, the servomotor piston 15c is in its lowermost position, pulling the valve disk 9d firmly onto its seat and with pilot 15a lowered to define a drain port for chamber 15b. The dashpot piston 13b is at the bottom of its stroke, because the spring 13c is pushing the piston 13b down relative to the cylinder 13a and there is no force (except the small weight of pilot valve 14a and lever 14j) which pulls against the spring force 13c.

The process of starting the turbine will be accomplished by the following action of the governing mechanism, beginning with the condition shown in Fig. 3 (except with pilot 24a elevated to the dotted line position 24d and dashpot link 13 "solid"). When the auxiliary oil supply pump (not shown) is started, in order to supply lubricating oil to the bearings and actuating liquid to the hydraulic mechanism, the pressure liquid supplied to port 17 will enter chamber 20 and cause piston 21 to rise to its uppermost position against stop 22a. The resulting condition of the mechanism is shown in Fig. 2. It will be seen that upward movement of piston 21 has pulled the rod 13j upwards against stop 13k, and the dashpot piston 13b is elevated somewhat above the position occupied in the normal steady state operating condition of Fig. 1. It will also be seen that pilot 14a has admitted operating liquid to move secondary relay piston 14b to its uppermost position against stop 14c, with the further result that pilot 15a has supplied operating liquid to chamber 15b to move servo motor piston 15c to the "open" position of valve 9d, as defined by the engagement of the annular shoulder 15k with its sealing seat in the bushing assembly 9b. Thus the intercept valve 9 is in condition to supply steam to the low pressure turbine 2.

The main stop valve 1b may now be opened and steam admitted to the high pressure turbine 1 by actuation of the main valve gear 1a, under control of a "load limit" device (not shown) associated with the main speed governor 7. As the turbine speed increases and the speed governor 7 takes over control, the fly-weights 11a of the pre-emergency speed governor move outwardly so as to pull the pilot 24 downwardly and decrease the supply of actuating liquid to chamber 20. Thus as speed goes above 99.6% of rated speed, piston 21 moves downwardly away from the stop 22a and approaches the 100% speed condition shown in Fig. 1. This of course causes the dashpot piston 13b to descend slightly, somewhat relieving the compression on spring 13c. The rod 13j remains in contact with stop 13k, so there is no change in the condition of the secondary relay 14 and the servomotor 15. The turbine is therefore in normal operation with the pre-emergency governing mechanism in "standby condition," having no effect on the intercept valve 9 so long as the speed remains steady and below 101% of rated speed, at which speed the pre-emergency governor is set to start operating the intercept valves upon a slow further increase of speed.

To illustrate the action of the pre-emergency governor in the event of a gradual rise in speed, the following operation may be noted. The design and adjustment of the linkage and the dashpot 13 is such that, when speed relay piston 21 reaches the 100.8% position, the abutment 13d of dashpot piston 13b will just engage the bottom of cylinder 13a. Then, further downward motion of speed relay piston 21 will cause the dashpot link to act as a "solid" connection, causing the lever 14j to move counter-clockwise and the rod 13j to move down and away from stop 13k. This motion causes secondary pilot 14a to descend and drain operating liquid from below piston 14b. The resulting downward movement of piston rod 14e lowers pilot 15a, drains operating liquid from chamber 15b, and effects lowering of piston 15c to cause the intercept valve 9d to move downwardly and begin to throttle the flow of motive fluid to the low pressure turbine 2 and, therefore, control the speed of the machine closing the intercept valves all the way if necessary.

Conversely, when the speed is over 105% and the turbine is slowing down gradually, the intercept valves will start opening at about 105% of rated speed. When the speed is reduced further to 101%, the intercept valves will be fully open. At 100.9%, the secondary relay will reach its top stop, and at 100.8% the sloted link 13j will engage the stop 13k. When the speed returns to 100%, the dashpot piston 13b will have returned to the position shown in Fig. 1.

The manner in which this governing mechanism achieves improved response of the control in the event of a high rate of acceleration is as follows. Assume that the governing mechanism is in the normal condition shown in Fig. 1, when the turbine suddenly loses its load and begins to accelerate at a rate in excess of a predetermined rate, which may for instance be on the order of 1% of rated speed per second. This means that speed relay piston 21 moves rapidly downwardly causing dashpot piston 13b to also descend, and at such a rapid rate that not enough oil can be passed from below piston 13b through the bypass conduit 13e. Therefore the oil trapped below piston 13b causes the dashpot to act as a substantially "solid" connection, so cylinder 13a immediately moves downwardly and rod 13j away from stop 13k and position pilot 14a to cause immediate closing movement of the intercept valve 9. Thus, in the event of a rate of acceleration, higher than 1% per second, the pre-emergency governor starts controlling almost immediately, substantially before the speed reaches 101%.

The improvement in the operation obtained may be seen from the following. A large steam turbine of the type described may, when it suddenly loses its load, accelerate at a rate from 10 to 16% of rated speed in one second. Without the invention, pre-emergency governors previously used would not begin to close the intercept valve for an interval of approximately 2/10 of a second after the beginning of the overspeed condition. On the other hand, with the invention, the pre-emergency governor mechanism described herein will, in the event of too great a rate of acceleration, begin to close the intercept valve after about 1/10 of a second. While the time intervals mentioned seem extremely small, the quantities of energy involved are so enormous that this improvement in reducing the time lag by 1/10 of a second results in a reduction of the energy supplied to the low pressure turbine by about 1/3 of the energy which would otherwise be supplied to the turbine 2 during the overspeed process. The speed increase, after loss of full load, can by use of the invention be reduced by 0.8 to 1% of rated speed. This is a substantial improvement in the overspeed performance of the speed control system.

Thus it will be seen that, by introduction of the novel dashpot breakdown link 13, I secure a very substantial improvement in the operation of the pre-emergency governor, without employing complex elements which might reduce the reliability of the mechanism.

While not material to an understanding of the present invention, it may be observed that the actuating oil supplied to the inlet port 17 of the pre-emergency speed relay does not come direct from the oil pump, but by way of a trip valve 8a associated with the emergency governor 8. Thus, when the emergency governor trips, its centrifugally operated ring flies out and trips valve 8a, so the supply of operating liquid to the pre-emergency speed governor 12 is immediately shut off and the oil from relay 21 is drained out. As shown in Fig. 1, the emergency governor 8 also trips a second valve 8b to discontinue the supply of operating liquid to the main stop valve 1b, so that it is immediately closed in the event of an emergency overspeed condition. It will further be seen that the operating liquid for the main control valve gear 1a and for the reheat stop valve 10 is supplied by way of the emergency governor trip valve 8a so that these valves 1a and 10 will also close in the event of an emergency overspeed condition, regardless of the position of the speed governor 7. It may also be noted that in starting the turbine, oil under pressure from some auxiliary source, such as an electric motor-driven pump, is supplied to lubricate the turbine bearings and actuate the hydraulic servo mechanism until such time as the main oil pump (not shown) reaches a speed where its delivery pressure is adequate for the lubrication and control functions. These arrangements are conventional in the steam turbine art; therefore, the details of this part of the hydraulic circuit need not be described more specifically here.

It will be appreciated that the structure described specifically herein is intended to be illustrative only, and actual embodiments of the invention may take various forms. The structure and arrangement of the secondary relay 14 and the servomotor 15 are intended to be entirely diagrammatic and these components may be of any suitable form. In an appropriate case, the piston rod 14e could be the final output member, and the pilot 15a and piston 15c dispensed with. Likewise, the mechanical construction of the primary speed relay 12 may take other forms. The essence of the invention lies in the dashpot 13, in combination with the adjustable stop 13k, arranged as described herein to effect one mode of operation upon gradual increase in speed above 101% of rated speed, but to react instantly and with another mode of operation in the event of acceleration at a rate greater than a preselected value.

It is of course intended to cover by the appended claims all such modifications as fall within the true spirit and scope of the invention.

What I claim as new and desire to secure by Letters Patents of the United States is:

1. In hydraulic servo mechanism for positioning an output member by actuating means including a servomotor having a servo-pilot valve and an output piston, and a first hydraulic relay including a signal input member connected to position a signal pilot valve for positioning a signal piston, link means connecting the signal piston with the servo-pilot valve and including dashpot means acting as a resilient connection during relatively slow movement of the signal piston in at least one direction and as a substantially non-resilient connection in the event of signal piston movement in the same direction at a rate greater than a preselected value.

2. Hydraulic servo mechanism for positioning an output member by actuating means including a first cylinder with an output piston adapted to be moved to an active position by the pressure of hydraulic fluid supplied thereto, servo-pilot means controlling the admission of operating fluid to said first cylinder, first stop means limiting the movement of said servo-pilot in the direction to increase the supply of operating fluid to the first cylinder, a hydraulic relay including a signal input member connected to position a signal pilot valve for positioning a signal piston, and linkage means connecting said signal piston to position said servo-pilot and including dashpot means comprising a piston member slidably disposed in a dashpot cylinder, means resiliently biasing said dashpot piston relative to the dashpot cylinder in a direction to cause said servo-pilot to engage said first stop means, restricted bypass means communicating fluid from one side of the dashpot piston to the other, and second stop means limiting motion of the dashpot piston relative to the dashpot cylinder under the influence of said dashpot biasing means, whereby the dashpot acts as a substantially resilient connection when movement of the signal output piston is at a rate below a pre-selected value corresponding to the capacity of said fluid bypass to communicate fluid from one side of the dashpot piston to the other, whereas the dashpot acts as a substantially non-resilient connection in the event the rate of movement of the signal output piston exceeds said pre-selected rate, the second stop means serving to cause the dashpot to act as a non-resilient connection to move the servo-pilot away from said first stop means after a pre-selected initial movement of the signal output piston.

3. In hydraulic servo-mechanism for positioning an output member including a servo-motor having a servo-pilot valve and an output piston and a first hydraulic relay including a signal input member connected to a pilot valve for positioning a signal output piston, the combination of linkage means connecting the signal output piston to the servo-pilot valve and including dashpot means with a cylinder containing a piston and fluid bypass means for communicating fluid from one side of the piston to the other at a restricted rate, first stop means limiting movement of the servo-pilot in one direction, resilient means biasing the dashpot piston relative to the dashpot cylinder to normally hold the servo-pilot against said first stop means, and second stop means limiting movement of the dashpot piston relative to the dashpot cylinder under the influence of said biasing means, whereby, in the event of movement of the signal output piston in a pre-selected initial range of movement at less than a pre-selected rate corresponding to the capacity of said bypass means to communicate fluid from one side of the dashpot piston to the other, said dashpot means acts as a resilient connection to permit movement of the signal output piston without effecting movement of said servo-pilot valve, whereas movement of the signal output piston in a secondary range of movement causes the dashpot means to act as a rigid connection causing the servo-pilot valve to move away from said first stop and effect movement of the output member, movement of the signal output piston at a rate greater than said pre-selected value causing the dashpot means to act as a substantially rigid connection to position the servo-pilot irrespective whether the signal output piston is in said initial or secondary range.

4. Hydraulic servo-mechanism for positioning an output member by actuating means including a first cylinder with an output piston resiliently biased to inactive position and adapted to be moved against said bias to an active position by the pressure of hydraulic fluid, servo-pilot valve means controlling the admission of operating fluid to said first cylinder, a floating lever member connected to position said servo-pilot valve, follow-up linkage means connected to restore said floating lever in accordance with movement of the output piston when hydraulic fluid is supplied thereto, first stop means adapted to limit the movement of said floating lever in the direction to increase the supply of operating fluid to the first cylinder, a hydraulic relay including a signal input member connected to position a signal pilot valve for positioning a signal piston, and linkage means connecting said signal piston to a portion of said floating lever spaced from the servo-pilot valve and including dash-pot means comprising a piston member slidably disposed in a dash-pot cylinder, means resiliently biasing the dashpot piston relative to the dashpot cylinder in the direction to cause the floating lever to engage said first stop means, second stop means limiting motion of the dashpot piston relative to the dashpot cylinder under the influence of said dashpot biasing means, and bypass means communicating fluid from one side of the dashpot piston to the other at a preselected limited rate, whereby movement of the signal piston in the direction to cause the servo-pilot to discharge operating fluid from the output piston causes said linkage means to act as a resilient connection effecting movement of the dashpot piston in the dashpot cylinder without causing the floating lever to move away from said first stop means, when movement of the signal piston is at a rate below a pre-selected value corresponding to the capacity of said bypass pasage to comunicate fluid from one side of the dashpot piston to the other, whereas said linkage means acts as a substantially non-resilient connection in the event the rate of movement of the signal piston exceeds said pre-selected value and the floating lever is caused to move away from the stop member to discharge operating fluid from the output piston.

5. Servo mechanism for positioning a motive fluid control valve of an elastic fluid turbine comprising a servo-motor having a servo-pilot member and an output member connected to position the turbine valve, a speed relay including a speed responsive member connected to position a speed signal member as a function of turbine rotor speed, and linkage means connecting the speed signal member to position the servo-pilot member, said linkage means including a dashpot with a piston and cylinder and a restricted fluid bypass around the piston, said dashpot acting as a resilient connection during relatively slow movement of the speed signal member and as a substantially non-resilient connection in the event of acceleration of the turbine rotor at a rate greater than a pre-selected value corresponding to the capacity of the bypass to communicate fluid from one side to the other of the dashpot piston.

6. In a reheat steam turbine powerplant having at least one high pressure turbine and one lower pressure turbine with reheater means in series between the turbines and inlet valve means controlling the admission of motive fluid to the high pressure turbine and adapted to shut down the unit completely in the event rotor speed rises to a pre-selected emergency condition, and intercept valve means adapted to throttle the supply of motive fluid from the reheater to the lower pressure turbine in the event rotor speed rises to a pre-emergency speed below said emergency condition, the combination of servo mechanism for positioning the intercept valve comprising a speed relay responsive to turbine rotor speed and having an output member positioned as a function of speed, servo-motor means for positioning the intercept valve and including a servo output member and a pilot member connected to position said output member, first stop means limiting movement of said servo pilot in the direction to open the intercept valve, and linkage means connecting said speed relay output member to the servo pilot and including dashpot means comprising a piston and cylinder with restricted fluid bypass means for communicating fluid from one side of the piston to the other and spring means for biasing the dashpot piston relative to the cylinder in the direction to cause the servo pilot to be biased into engagement with said first stop means when the speed relay piston is below the position corresponding to said pre-emergency speed, and second stop means limiting movement of the dashpot piston in the dashpot cylinder in the direction to move the servo pilot away from said first stop member, said second stop means causing the dashpot piston to reach the end of its travel and move the servo pilot away from the first stop when the pre-emergency speed is exceeded.

7. In an elastic fluid turbine powerplant having at least one turbine with inlet valve means controlling the admission of motive fluid thereto and adapted to shut down the unit completely in the event rotor speed rises to an emergency condition, and auxiliary valve means for throttling the flow of motive fluid in the event rotor speed rises to a pre-emergency speed below said emergency condition, the combination of servo mechanism for positioning said auxiliary valve means comprising a first relay having means responsive to turbine rotor speed and a signal output member positioned as a function of speed, servo-motor means connected to position said auxiliary valve means and including a servo output member and a servo-pilot connected to position the servo output member, first stop means limiting movement of the servo-pilot in the direction to open the auxiliary valve means, and linkage means connecting the signal output member to the servo-pilot and including dashpot means with a piston and cylinder connected to said respective signal output and servo-pilot members, fluid bypass means communicating fluid at a restricted rate from one side of the dashpot piston to the other, resilient means biasing the dashpot piston relative to the dashpot cylinder in the direction to cause the servo-pilot to be held in engagement with said first stop means when turbine rotor speed is below said pre-emergency speed, and second stop means limiting movement of the dashpot piston under the influence of said biasing means, said second stop means engaging the dashpot cylinder to cause the dashpot to act as a non-resilient connection to cause the servo-pilot to move away from the first stop when the pre-emergency speed is exceeded, said dashpot being constructed and arranged to act as a susbtantially non-resilient connection in the event the rate of movement of the signal output piston exceeds the capacity of the fluid bypass to communicate fluid from one side of the dashpot piston to the other.

8. The combination as claimed in claim 1 and including means for varying the relative speed ranges of movement of the signal piston during which the dashpot acts as a resilient connection and during which the dashpot acts as a substantially non-resilient connection.

9 A servo-mechanism as claimed in claim 5 and including means for varying the amount of restriction in the fluid bypass around the piston.

References Cited in the file of this patent
UNITED STATES PATENTS 1,777,458    Allen _____ Oct. 7, 1930

FOREIGN PATENTS 475,042    Germany _____ Apr. 16, 1929